G. W. N. YOST.
Cultivator.
No. 12,571.
Patented Mar. 20, 1855.
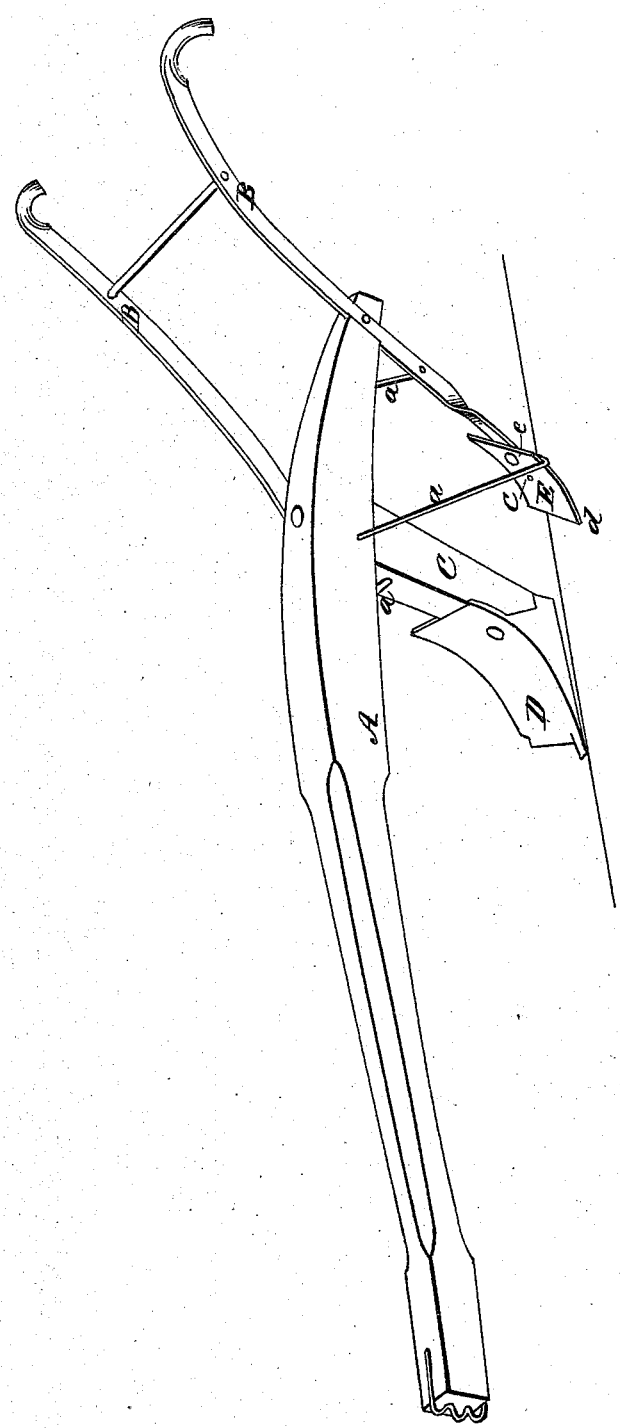

UNITED STATES PATENT OFFICE.

GEO. W. N. YOST, OF PORT GIBSON, MISSISSIPPI.

IMPROVEMENT IN CULTIVATORS.

Specification forming part of Letters Patent No. 12,571, dated March 20, 1855.

*To all whom it may concern:*

Be it known that I, G. W. N. YOST, of Port Gibson, Claiborne county, and State of Mississippi, have made certain new and useful Improvements in Cotton and other Cultivators; and I hereby declare that the following is a full, clear, and exact description of the same, reference being had to the drawing accompanying this specification, and to the letters of reference marked thereon.

The drawing is a perspective of the same.

To enable others skilled in the art to make and use my invention, I will proceed to describe its construction and operation.

I construct my cultivator for cotton, corn, &c., out of any known material used for such purpose, and in its general appearance it has the form of a plow.

A is the beam; B, the handles; C, the helve; *a a a*, iron rods or braces for binding and supporting the plow; D, the point, bar, and mold-board; E, the scraper. The scraper E is secured to the handle B by means of two bolts, *c c*, it slightly turning on the lower one, and the upper one working in a slot or hole in the scraper E for the purpose of raising or lowering the point of the scraper *d* to do good work on the side of a higher or lower row.

The operation of my improved cultivator is as follows: The point, bar, and mold-board D bar off the row and rap up the middle, while the scraper E scrapes off the row, turning it under into the furrow.

In order that scraper E may perform its proper functions it is necessary that its position be as follows: It must stand six inches behind the bar and five inches closer to the row than bar D. It must have an elevation of about fifteen degrees on the front side or point, where it strikes the row, that the earth and dressing may pass off on the outer side readily into the furrow. The size of the scraper and its distance from the bar depend on the size of the plow.

I am aware that cultivators and scrapers have been used which were laterally and perpendicularly adjustable. Therefore I do not claim such devices; but

What I claim, and desire to secure by Letters Patent of the United States, is—

The combination of the adjustable scraper E with the bar, point, &c., D, as already described, for the purpose of barring off the row and rapping up the middle, also for scraping off the row and rolling the scrapings over into the furrow opened by the plow, substantially as set forth in this specification.

GEO. W. N. YOST.

Witnesses:
SAML. GRUBB,
T. G. CLAYTON.